US012130789B1

(12) United States Patent
Lin et al.

(10) Patent No.: US 12,130,789 B1
(45) Date of Patent: Oct. 29, 2024

(54) DATA LINEAGE TRACKING SERVICE

(71) Applicant: Amazon Technologies, Inc., Seattle, WA (US)

(72) Inventors: Jonathan Lin, Shoreline, WA (US); Richa Sharma, Redwood City, CA (US); Lalit Kumar Mehta, Pathankot (IN); Yashi Gupta, Bulandshahar (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/361,689

(22) Filed: Jul. 28, 2023

(51) Int. Cl.
*G06F 16/21* (2019.01)
*G06F 16/2458* (2019.01)
*G06F 16/25* (2019.01)
*G06F 16/26* (2019.01)

(52) U.S. Cl.
CPC ........ *G06F 16/219* (2019.01); *G06F 16/2477* (2019.01); *G06F 16/256* (2019.01); *G06F 16/26* (2019.01)

(58) Field of Classification Search
CPC .. G06F 16/219; G06F 16/2477; G06F 16/256; G06F 16/26
See application file for complete search history.

(56) References Cited

U.S. PATENT DOCUMENTS

| 8,812,752 | B1 | 8/2014 | Shih et al. |
|---|---|---|---|
| 9,396,037 | B2 | 7/2016 | Morsi et al. |
| 9,684,502 | B2 | 6/2017 | Fu et al. |
| 10,135,705 | B2 | 11/2018 | Asenjo et al. |
| 10,754,752 | B2 | 8/2020 | Rickard et al. |
| 10,853,338 | B2 | 12/2020 | Meacham et al. |
| 10,936,479 | B2 | 3/2021 | Maag et al. |
| 10,996,878 | B2 | 5/2021 | Das et al. |
| 11,243,704 | B2 | 2/2022 | Das et al. |
| 11,314,698 | B2 | 4/2022 | Dang |
| 2023/0065530 | A1* | 3/2023 | Mohanty ............. G06F 11/3068 |
| 2024/0103719 | A1* | 3/2024 | Gasparakis ........... G06F 9/4494 |

* cited by examiner

*Primary Examiner* — Etienne P Leroux
*Assistant Examiner* — Cindy Nguyen
(74) *Attorney, Agent, or Firm* — Robert C. Kowert; Kowert, Hood, Munyon, Rankin & Goetzel, P.C.

(57) ABSTRACT

A plurality of events is extracted from a set of sources, including an event representing a transfer of a first data set from one data storage stage of a data pipeline to another stage to form a second data set, and another event representing a completion of a computation performed on the second data set. Based on analysis of the plurality of events, a graph is stored; the nodes of the graph represent data sets at respective stages of the data pipeline, and edges represent the events. In response to a request for lineage information pertaining to a particular data set at a particular stage of the pipeline, an indication of a sequence of events represented in the graph is provided, including a particular event which led to the presence of the particular data set at the particular stage.

20 Claims, 9 Drawing Sheets

DATA LINEAGE TRACKING SERVICE

BACKGROUND

For many applications at large-scale enterprises, data sets collected from various sources may pass through several stages of storage and analysis for diverse business purposes, with different teams responsible for tasks at the different stages. In some cases the data sets may be filtered and transformed as they pass through the stages. Understanding the big picture of how different data sets are used and transformed as they traverse the stages of such data pipelines is non-trivial, and can require substantial institutional knowledge. Even if an individual in one of the teams has enough expertise to support that team's own workloads at a particular stage, the individual may not know exactly how the team's tasks impact downstream data set consumers, or the dependencies of the tasks on upstream data set producers.

Figure 1:
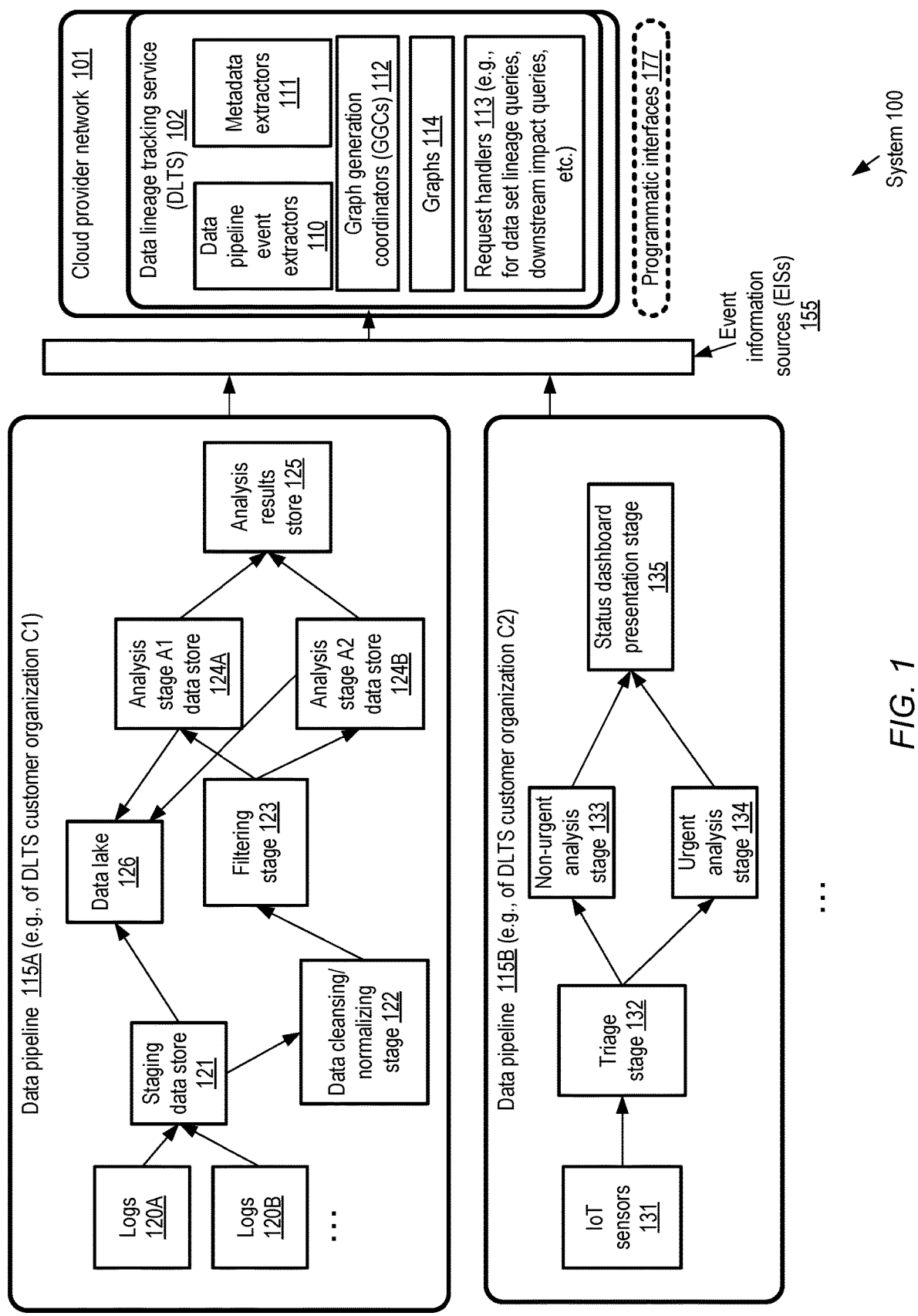
FIG. 1 illustrates an example system environment in which a cloud-based data lineage tracking service may be implemented, which automatically generates graphs which can be used to respond to queries pertaining to data set transitions through data pipelines, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for automatically tracking data sets as they traverse various stages of complex data pipelines of applications implemented at large-scale enterprises, creating graphs representing such traversals, and using the graphs and associated metadata to provide responses to queries pertaining to the lineage or history of data sets as they traverse the pipelines and/or to queries pertaining to downstream usage of data sets in the pipelines. Such data pipelines may for example comprise several different data storage stages (e.g., the data may be collected from numerous sources in various formats and stored initially in an unstructured object storage service, then cleansed and standardized for storage in a relational or non-relational database, and so on), data filtering stages (e.g., in which respective subsets of the data may be selected for different types of downstream analyses) and/or data analysis stages (in which for example machine learning models may be used to generate predictions based on filtered subsets of the data), and so on. Transitions between different stages may be asynchronous in at least some cases—e.g., some data sets may be transferred from one stage to another via push mechanisms at scheduled intervals, other data sets may be obtained via pull mechanisms when the receiving stage is ready for the data set, and so on. In some cases, new batches of raw data may be collected periodically (e.g., once every day or one every hour) and pushed through the data pipelines, following similar paths as were used by earlier batches of data. Different teams of employees of the enterprises may be responsible for implementing the different stages of such data pipelines in some cases. Different authorization artifacts/settings (such as permissions stored at an identity management service) may be required for accessing the data sets at the respective stages in some cases, so in many cases a given individual may not be able to track the data easily as it moves through all the different stages. Depending on the overall complexity of a given data pipeline, an individual working on a particular stage may not necessarily know, or be able to quickly determine using a centralized source of information, why a data set was not received when it was expected, or what all the downstream impacts of a failure or delay at the particular stage may be.

A data lineage tracking service (DLTS) may be implemented at least in part at a cloud provider network in various embodiments to collect information about the movement and transformation of data sets as they traverse data pipelines of various customers. Such a DLTS may then serve as a central repository which can be used to view the progress of the data sets. The DLTS may implement a set of easy-to-use interfaces such as web-based consoles or graphical user interfaces enabling clients (such as individuals working on the various stages or managing one or more stages) to determine various kinds of information about the history or lineage of a given data set that has reached or exited a particular data pipeline stage. Lineage queries may for example, request an indication of the data set transitions that occurred earlier and led to the given data set reaching the current stage, when exactly those transitions occurred, who was responsible for invoking application programming interfaces (APIs) or other actions that led to the transitions, what the parameters of such APIs were, and so on. The DLTS may also store data pipeline templates in some embodiments, which indicate the patterns of transitions new data sets are expected to undergo after they enter a pipeline. Such templates may be used to provide responses to queries about the downstream uses of data sets—e.g., at which other pipeline stages particular data set is expected and when, which other stages would be impacted by a failure at a particular stage, and so on. In embodiments in which a DLTS is implemented using resources of a cloud computing environment or provider network, the DLTS itself be highly scalable and highly available, so that it can handle the collection of data pipeline information for numerous pipelines on behalf of numerous customers. In some cases, at least some of the stages of the data pipelines may themselves utilize resources at services of the provider network, such as an object storage service, a relational database service, a data lake service, a virtual computing service, a machine learning service, etc. Some stages may be primarily used for storing data until it can be further analyzed, other stages may be used primarily for performing analysis computations such as filtering or classification, and yet other stages may be used for both storage and computations/analyses.

In at least some embodiments, the DLTS may utilize the information about data set transitions that it has collected from various event information sources (such as logs generated at various stages, and/or event buses into which records of transitions are inserted via API invocations from the different stages) to automatically create data flow graphs stored in a graph database. A given graph may comprise a plurality of nodes and a plurality of edges. A given node may represent a data set at a particular stage of a data pipeline, and an edge linking one node to another may represent the transition of at least a portion of a data set from one stage to another in some embodiments. Standardized schemas maintained at the DLTS may be used for the nodes and edges, such that information about inter-stage transitions for a wide variety of data pipelines of different clients and different applications can be maintained in a common format. Graph databases can be used to efficiently represent (and respond to queries pertaining to) relationship information about hundreds or thousands of entities, and therefore represent an efficient way to store information about large numbers of data set transitions of numerous data pipelines. The graphs generated at a DLTS may be stored at a graph database service of a cloud provider network in some embodiments.

In various embodiments, resources of the DLTS (and/or other services used for the data pipeline stages) may be configured in a multi-tenant manner and used on behalf of more than one customer or client. For example, a given storage service may be used to store data sets of respective pipelines of multiple customers, a given event bus (an event information source from the perspective of the DLTS) may be used to record the occurrences of events representing data set transitions of data pipelines of many different customers, and so on. In at least some embodiments, clients of the DLTS may provide event selection criteria to the DLTS via programmatic interfaces, indicating how the events pertaining to the clients' pipelines should be identified or selected from among other events represented in a given event information source. In some embodiments, the DLTS may be implemented at a public cloud computing environment or provider network (i.e., a cloud environment whose services can be used by any clients with Internet access), while in other embodiments, the DLTS may be implemented at a private cloud computing environment (whose services can only be accessed from within a given organization) or a hybrid public-private cloud environment.

As one skilled in the art will appreciate in light of this disclosure, certain embodiments may be capable of achieving various advantages, including some or all of the following: (a) providing a centralized resource which can be easily queried for determining the history of data set transitions and transformations at various data pipelines, without repeatedly expending computing and other resources to acquire permissions for, and directly access records from, the different stages of the pipeline and and/or (b) enabling rapid notification of failures and/or delays at a given stage of a data pipeline to be provided to entities, teams or individuals responsible for numerous downstream stages.

According to some embodiments, a system may include one or more computing devices. The one or more computing devices may include instructions that upon execution on or across the one or more computing devices obtain, at a data lineage tracking service (DLTS) of a cloud computing environment, an indication of (a) one or more event information sources from which occurrences of events pertaining to one or more data pipelines including a particular data pipeline can be detected and (b) a selection criterion for events pertaining to the particular data pipeline. The particular data pipeline may include a plurality of stages including a first data storage stage, a second data storage stage, and a data analysis stage. The event information sources may include, among others, event buses (such as buses implemented at a cloud-based event management service), logs (e.g., comprising log records generated at computing devices or storage devices used at the different stages of the data pipelines).

The DLTS may extract, from the one or more event information sources, using at least the selection criterion, a plurality of events pertaining to the particular data pipeline in some embodiments. The selection criterion may indicate, for example, a set of event identification strings (e.g., a string such as "Pipeline-A" or "DB-table-T1") that can be used by the DLTS to select only those events that occur during execution of the particular pipeline, while ignoring other events that may also be recorded in the same event information source but may not pertain to the particular pipeline. The plurality of events may, for example, include a first event which represents a transfer of at least a portion of a first data set from the first data storage stage to form a second data set at the second data storage stage, a second event which represents a transfer of at least a portion of the second data set from the second data storage stage to form a third data set at the data analysis stage, and a third event which represents a completion of a computation performed on at least a portion of the third data set at the data analysis stage. In at least some embodiments, one or more of the data storage stages may utilize cloud-based services. For example, the first data storage stage may comprise or utilize resources of a first storage service (such as an object storage service) of a cloud computing environment which supports a first set of APIs (such as Representational State Transfer or REST GET and PUT APIs) and a first data model (such as a model that supports unstructured objects, treated as binary large objects or blobs with no requirement for a pre-defined schema). In contrast, the second data storage stage may comprise or utilize resources of a second storage service (such as a relational database service) of the cloud computing environment which supports a second set of APIs (e.g., Structured Query Language or SQL-based APIs) and a second data model (e.g., the relational data model). The APIs and the data models supported by the respective data storage stages may differ from one another in various embodiments.

Based at least in part on analysis of the plurality of events, in various embodiments the DLTS may generate and store at least a portion of a particular graph comprising a plurality of nodes and a plurality of edges. Individual ones of the nodes may represent a respective data set at a respective stage of the plurality of stages of the particular pipeline. Individual ones of the edges may indicate individual ones of the plurality of events. In at least some embodiments, the graph may be stored in a graph database at the cloud computing environment, e.g., at a graph database service.

A query or request for lineage information pertaining to a particular data set at a particular stage of the plurality of stages may be obtained at the DLTS in at least some embodiments, e.g., via a programmatic interface implemented by the DLTS. In response, the DLTS may provide an indication of a sequence of events represented in the particular graph, including a particular event which resulted in or led to a presence of the particular data set at the particular stage. Such events that occurred earlier and resulted in the presence of the particular data set at the particular stage may be referred to as predecessor events herein. Similarly, the stages of the pipeline at which the predecessor events occurred may be referred to as predecessor stages, and the data sets whose transfers and/or processing at the predecessor stages eventually led to the particular data set reaching the particular stage may be referred to as predecessor data sets. Several kinds of information may be included in the response to a lineage request in different embodiments, such as the time at which predecessor data sets of the particular data set indicated in the request arrived at, and/or were stored at, different predecessor stages of the pipeline. In one embodiment, the response to a lineage query may identify the entity or entities responsible for one or more events of the pipeline (e.g., the individual that invoked a particular API to cause a predecessor data set to reach a particular stage), and/or the API or APIs that were invoked (along with the corresponding API parameters) to cause data set transitions at various predecessor stages. Events of a data pipeline which are expected to occur at some point after a particular event of the data pipeline, and at least in some cases may be dependent on completion of the particular event, may be referred to as successor events or downstream events with respect to the particular event herein; if a downstream event occurs at a different stage of the pipeline than the particular event, that different stage may be referred to as a successor stage or a downstream stage.

In at least some embodiments, new stages may be added dynamically to a data pipeline for which graphs are being created by a DLTS. For example, consider a data pipeline with four stages S1, S2, S3 and S4. A client at whose request the graphs are being generated, such as an administrator of one or more stages or an administrator of the pipeline as a whole, may submit a programmatic request to add another stage S5 (between S2 and S3 for example), and provide an indication of an event information source from which information about transitions of data sets to/from S5 can be obtained. The provided information may be utilized by the DLTS to extract information about such events pertaining to S5, and to include representations of such events in subsequently-generated graphs corresponding to the data pipeline which initially comprises S1, S2, S3 and S4. S5 may, for example, comprise a stage at which a newly-trained machine learning model is used to generate inferences or predictions based on analysis of a portion of data passing through the pipeline.

FIG. 1 illustrates an example system environment in which a cloud-based data lineage tracking service may be implemented, which automatically generates graphs which can be used to respond to queries pertaining to data set transitions through data pipelines, according to at least some embodiments. As shown, system 100 may comprise resources and artifacts of a DLTS 102 implemented at a cloud provider network 101. The DLTS may comprise one or more data pipeline event extractors 110, metadata extractors 111, graph generation coordinators 112 and request handlers 113 in some embodiments. These subcomponents of the DLTS may each comprise some combination of hardware and software at one or more computing devices. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

The DLTS may implement a set of programmatic interfaces 177, which can be used by DLTS clients to submit requests or messages pertaining to various data sets that move through data pipelines of the clients, such as data pipelines 115A and 115B, and receive corresponding responses. The programmatic interfaces may include, for example, web-based consoles, graphical user interfaces, application programming interfaces (APIs), command-line tools and the like in different embodiments.

Data pipeline 115A may represent various stages of storage and analysis of data sets pertaining to one or more applications of a DLTS customer organization or client C1, while data pipeline 115B may represent various stages of storage and analysis of data sets pertaining to one or more applications of another DLTS client organization C2. Each pipeline may comprise a plurality of stages, with individual ones of the stages being used for storing, analyzing and/or transforming data from a respective set of raw data sources. In at least some embodiments, one or more of the stages may utilize resources of other network-accessible services of the cloud provider network, such as object storage services, database services, machine learning services and the like. In at least some embodiments, raw (i.e., unprocessed) data sets may typically be created or collected periodically, e.g., once every day or once every hour, and then processed via the pipeline stages; thus, different data may pass through the stages over time.

Data pipeline 115A may be used to process data stored in various logs (e.g., logs established at servers being used to execute a portion of a web services application of C1) such as logs 120A and logs 120B. The raw log records may be combined in a pipeline stage utilizing a staging data store 121. From there, the data may be passed through a data cleansing/normalizing stage 122 (in which the data is put into a standard format of the pipeline) and a filtering stage 123 in the depicted example. In the filtering stage, respective subsets of the normalized log records may be selected for analysis at two downstream data store stages: analysis stage A1 data store 124A, and analysis stage A2 data store 124B. For example, one subset of the data may pertain to transactions of a particular type performed on behalf of end users of the applications whose log records were collected, and analysis on those types of transactions may be performed, e.g., using a first set of analysis programs, after that subset of the data is stored at the analysis stage A1 data store. Another subset of the data may pertain to transactions of a different type, and analysis on these types of transactions may be performed using a second set of analysis programs after that subset of the data is stored at the analysis stage A2 data store. Results of both types of analysis, and a summarized version of the records that were analyzed at each of the analysis stages, may be transmitted to analysis results store 125 of pipeline 115A. In the depicted example, a data lake 126 may be maintained for the application whose data is processed in data pipeline 115A, and the staged data along with the analysis stage subsets of the data may all be stored to the data lake as well (e.g., for later analysis).

In data pipeline 115B of customer C2, raw data sets may be collected, e.g., over various time periods from Internet-of-Things (IoT) sensors 131 and sent for storage and analysis to a triage stage 132. At the triage stage, the records of data collected from the sensors may be classified into non-urgent (records that indicate behaviors of the IoT devices that lie within normal ranges, and hence do not require immediate analysis) versus urgent (records that indicate unusual activities or states of the IoT devices, and hence may require more rapid analysis to determine if any corrective actions are needed). The non-urgent subset of the data sets may be sent to a non-urgent analysis stage 133, and the urgent subset may be sent to an urgent analysis stage 134 in the depicted example scenario. The respective subsets of the data may be stored as well as analyzed at stages 133 and 134. Summarized versions of the urgent and non-urgent data may be set to a status dashboard presentation stage 135 in the example shown. Note that in at least some embodiments, as indicated in the discussion of some of the stages of pipelines 115A and 115B, new data sets may in effect be created (e.g., by filtering/classifying incoming data, or by transforming data via summarization) at some pipeline stages from the input data sets received at the stages.

In the embodiment depicted in FIG. 1, respective records of various data set transitions may be written to or stored at one or more event information sources (EISs) 155. For example, a record identifying a data set and indicating a time T1 at which it was received at a given stage may be added to an EIS 155, another record indicating that the data set was filtered at that stage and the filtering result (considered a new data set) was sent to a subsequent stage at time T2 may be added to an EIS, and so on. A number of different EISs may be used in some embodiments, such as logs of the services at which the stages are implemented, event buses created at a server-less event bus service of the cloud provider network, and so on. In some cases, the information about the events may be stored by invoking APIs at the stages of the data pipelines—e.g., the programs implementing the business logic of the different stages may comprise API calls that result in records of the events representing data set transitions being stored at selected EISs.

In the embodiment depicted in FIG. 1, the graph generation coordinators (GGCs) 112 of the DLTS may be responsible for creating graphs 114 representing the movement of specific data sets among the stages of the data pipelines. Those graphs may then be queried to determine the history or lineage of a data set at a particular stage (i.e., the set of predecessor events that led to the presence of the data set at that stage) of a data pipeline. As indicated earlier, in many cases new raw data may be collected periodically or repeatedly and passed through a given data pipeline. In at least some embodiments, the graphs may indicate the transitions of data sets for each new raw collection of data that is processed—e.g., one graph may indicate the events that occurred to a raw data set collected from IoT sensors 131 at 10 am on a particular date, a second graph may indicate the events that occurred to another raw data set collected at 11 am on that date, and so on. In at least some embodiments, the DLTS may also store templates that represent the expected transitions/events of data sets at a given pipeline. Such templates may for example indicate temporal information about the sequence of events of the pipeline such as when or how frequently new raw data is typically expected to be accumulated for analysis, the frequency at which other events of the pipeline are expected to recur, the paths in which data sets generated from the raw data are expected to move, the volumes of data typically expected to flow through the pipelines, and so on. In effect, such a template may indicate how data sets of various types are anticipated to move and be analyzed in general, while the graphs may indicate how specific data sets actually moved and were analyzed. Templates may be utilized to respond to queries about downstream effects of data set events—e.g., the set of other stages that would be impacted if a transfer of a given data set at a given stage failed or was delayed. In at least some embodiments, the graphs 114 generated at the DLTS may be stored using a graph database service of the cloud provider network.

In various embodiments, the DLTS may have to select, from various event information sources, the specific events that are to be converted into a given graph on behalf of a client such as customer C1 or customer C2. In some embodiments, an indication of (a) one or more EISs from which occurrences of events pertaining to a particular data pipeline of a customer can be detected and (b) an event selection criterion for events pertaining to the particular data pipeline may be obtained via programmatic interfaces 177 at the DLTS.

The event extractors 110 may extract, from the one or more EISs, using at least the event selection criterion, a plurality of events pertaining to the particular data pipeline of the customer. The plurality of events may, for example, include events representing transfer of data between pairs of stages, events representing analysis or computations performed at a given stage, and so on. Based at least in part on analysis of the plurality of events, in various embodiments the GGCs of the DLTS may store at least a portion of a particular graph comprising a plurality of nodes and a plurality of edges. Individual ones of the nodes may represent a respective data set at a respective stage of the plurality of stages of the particular pipeline. Individual ones of the edges may indicate individual ones of the plurality of events. In some embodiments, in addition to the information contained in the event representations stored in the EISs themselves, additional metadata pertaining to the events may also be included in the graph. Such additional metadata may, for example, include performance statistics on the storage and/or analysis performed at the various stages (e.g., the CPU utilization levels of computing servers used for various stages of the analysis, the storage utilization levels of storage devices at which a data set was stored, the sizes of the data sets, etc.), details about the APIs whose invocation led to transitions of a data set from one stage to another, trends in the performance statistics, and so on. Metadata extractors 111 may be responsible for obtaining such metadata (e.g., from a performance monitoring service of the cloud provider network) and providing the metadata to the GGCs for inclusion in the graphs in the depicted embodiment.

End users such as administrators or employees of the DLTS customer organizations on whose behalf the graphs were generated may submit various kinds of queries pertaining to the data pipelines and associated graphs via the programmatic interfaces 177 in the depicted embodiment. For example, a query for lineage information pertaining to a particular data set at a particular stage of the one of the pipelines be obtained at the DLTS, e.g., by a request handler 113. In response, the DLTS may provide an indication of a sequence of events (e.g., a transition from stage S1 to stage S2 at time T1, another transition from stage S2 to stage S3 at time T2, etc.) represented in the corresponding graph, including a particular event which resulted in a presence of the particular data set at the particular stage. The information provided by the DLTS may include, among other details, the times at which various events of the sequence occurred, an entity responsible for one or more of the events (such as the user ID at whose request a data set transfer was initiated), parameters of the APIs that resulted in data set transition or analysis events, and so on in various embodiments. Queries pertaining to expected downstream events or stages with respect to a particular event or data set may be received as well, and templates stored at the DLTS may be used to respond to such queries in some embodiments.

New stages may be added to data pipelines by the pipeline owners (e.g., administrators at organizations C1 or C2) from time to time in some embodiments. In at least one embodiment, programmatic interfaces 177 may be utilized to inform the DLTS about the new stages and the corresponding EISs. In some embodiments, information about a failure that occurred at a particular stage of a particular data pipeline (e.g., if a program that was transmitting a data set to a subsequent stage crashed) may be automatically detected at the DLTS (e.g., by examining logs associated with the stages), and a notification of such a failure may be automatically provided to one or more destinations associated with a subsequent stage of the pipeline (e.g., an email address or phone of an administrator of the subsequent stage, or some other entity or program associated with the subsequent stage). In some embodiments, different stages of a data pipeline may be owned by respective distinct client accounts of the provider network. Note that in some cases, some of the transitions of a data pipeline may comprise copying at least a portion of a data set from one data storage stage to another data storage stage; in such cases, the new data set created may contain at least some of the same content as the source data set which was copied. In at least one embodiment, such a copy may be performed within the same cloud-based storage service—e.g., the source data set DS1 may be stored within one object O1 at a cloud-based object storage service, and the copied data set DS2 may be stored within a different object O2 at the same service. In this example, multiple stages of the data pipeline may thus be implemented within a single cloud service.

Figure 2:
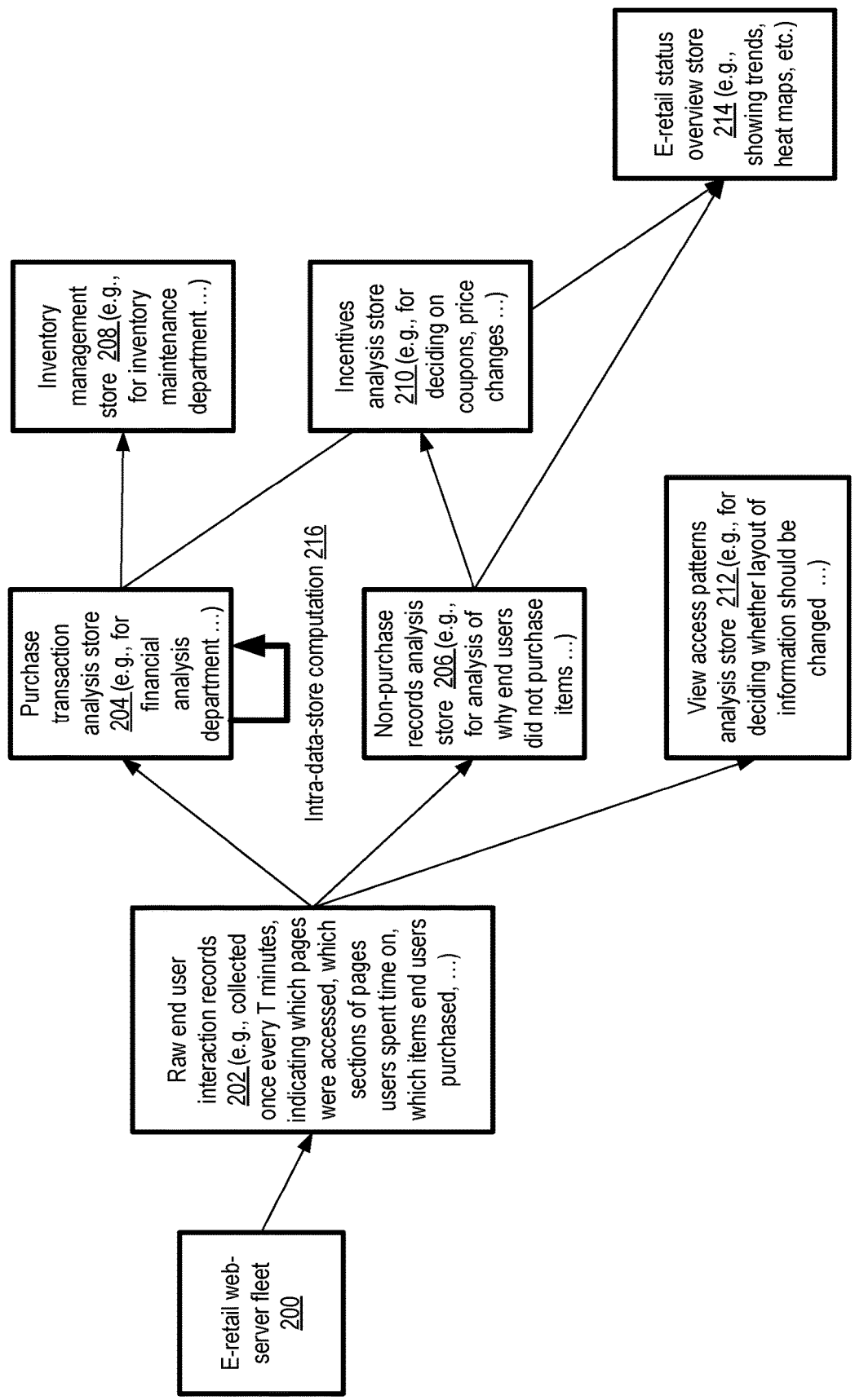
FIG. 2 illustrates an example of a data pipeline pertaining to an e-retail application, according to at least some embodiments.

FIG. 2 illustrates an example of a data pipeline pertaining to an e-retail application, according to at least some embodiments. An e-retail web server fleet 200 may be set up to serve web pages which can be accessed by customers of the e-retailer to browse and purchase items in the depicted example scenario. A set of raw end user interaction records 202 may be generated from the web server fleet. The interaction records, the most recent groups of which may for example be collected once every T minutes, may provide various kinds of information about end user interactions. They may, for example, indicate which specific web pages were accessed and as a result of clicking on which kinds of links, which sections of the page layouts end users spent more time one relative to others, which items end users purchased, and so on.

A subset of the interaction records which pertains to the purchases made by the end users may be sent to a purchase transaction analysis store 204, which may for example be accessible by employees of a financial analysis department of the e-retailing organization. One or more types of intra-data-store computations 216 may be performed in the depicted embodiment on the purchase-related records, such as purchase trends analysis, profit trends analysis, and so on, using a set of analytics programs or tools. Intra-data-store computations may also be performed at one or more of the other stages of the e-retail data pipeline of FIG. 2 in some embodiments. In other embodiments, the data pipeline may comprise some stages at which computations are performed on data sets on the fly, e.g., without storing the data on persistent storage devices within the stages themselves.

At least a version of the purchase-related records may be copied to an inventory management store 208 of the e-retailer in the depicted embodiment. For example, from the purchase-related records, information about the prices at which the items were sold may in some cases be deleted before the records are sent to the inventory management store, as the prices may not be particularly relevant to inventor management decisions per se. The inventory management store may be accessible to employees of an inventory management department of the e-retailer, but not to employees of the financial analysis department.

In some cases, end users of the e-retail web site may have made some decisions (reflected in their interaction records) indicating an interest in purchasing items, but may have eventually decided not to purchase the items. For example, a user may have placed an item into an electronic shopping cart, but may not have completed the purchase. Another user may have added items to a wish list without purchasing them, and so on. A subset of the end user interaction records indicating such actions may be sent to a non-purchase records analysis store 206 in the depicted embodiment, where an analysis may be performed to try to determine why the purchase transactions were not completed even though the end users appeared to be at least somewhat interested in purchasing items. Some of the non-purchase records may be copied to an incentives analysis store 210, where analysis to decide whether additional incentives (such as temporary price reductions, coupons, etc.) should be created for increasing the sales of some of the items that were not purchased.

A subset of the information contained in the raw end user interaction records may be sent to a view access patterns analysis store 212 in the depicted embodiment. Here, the patterns in which end users interacted with various portions of a web page (e.g., which portion of the layout end users tended to spend more time on, the locations of such layout sections within the page, and so on) may be analyzed. The results of the analysis may be used to help decide whether changes to the layouts are advisable, how the information about the items could be distributed more beneficially among the sections of the page (for example, so that users can view a summary of item reviews next to an image of an item without having to scroll to another section of the web page) and so on.

The data pipeline of the e-retail application may include an e-retail status overview store 214 in the depicted example scenario. Here, summarized versions of the data sets that were analyzed at the purchase transaction analysis store, as well as the non-purchase records analysis store, may be obtained and stored in some embodiments. The versions of the data sets stored in this stage of the pipeline may for example be used to present graphical representations of the status of the e-retail web site, such as trends in purchases, heat maps showing which sections of the web sites have been more popular in the recent past, and so on.

Individual ones of the stages of the e-retail data pipeline shown in FIG. 2 may utilize different data models in some cases, may utilize resources of different cloud-based services to implement their functions, and/or have other properties which differ from those of other stages. For example, in one embodiment the raw end user interaction records may be stored at an object storage service which supports unstructured data, while some of the other stores may utilize relational database services or key-value non-relational data stores. The transitions between different pairs of stages may occur asynchronously with respect to one another in some embodiments, and at different temporal frequencies. For example, the purchase transaction records may be analyzed more frequently than the analysis of vie access patterns is conducted in one embodiment. A DLTS similar in features and functionality to DLTS 102 of FIG. 1 may capture event records pertaining to the movement of data through various stages of the pipeline, generate and store corresponding graphs, and provide responses to data lineage queries and/or downstream impact queries of the kind indicate above.

Figure 3:
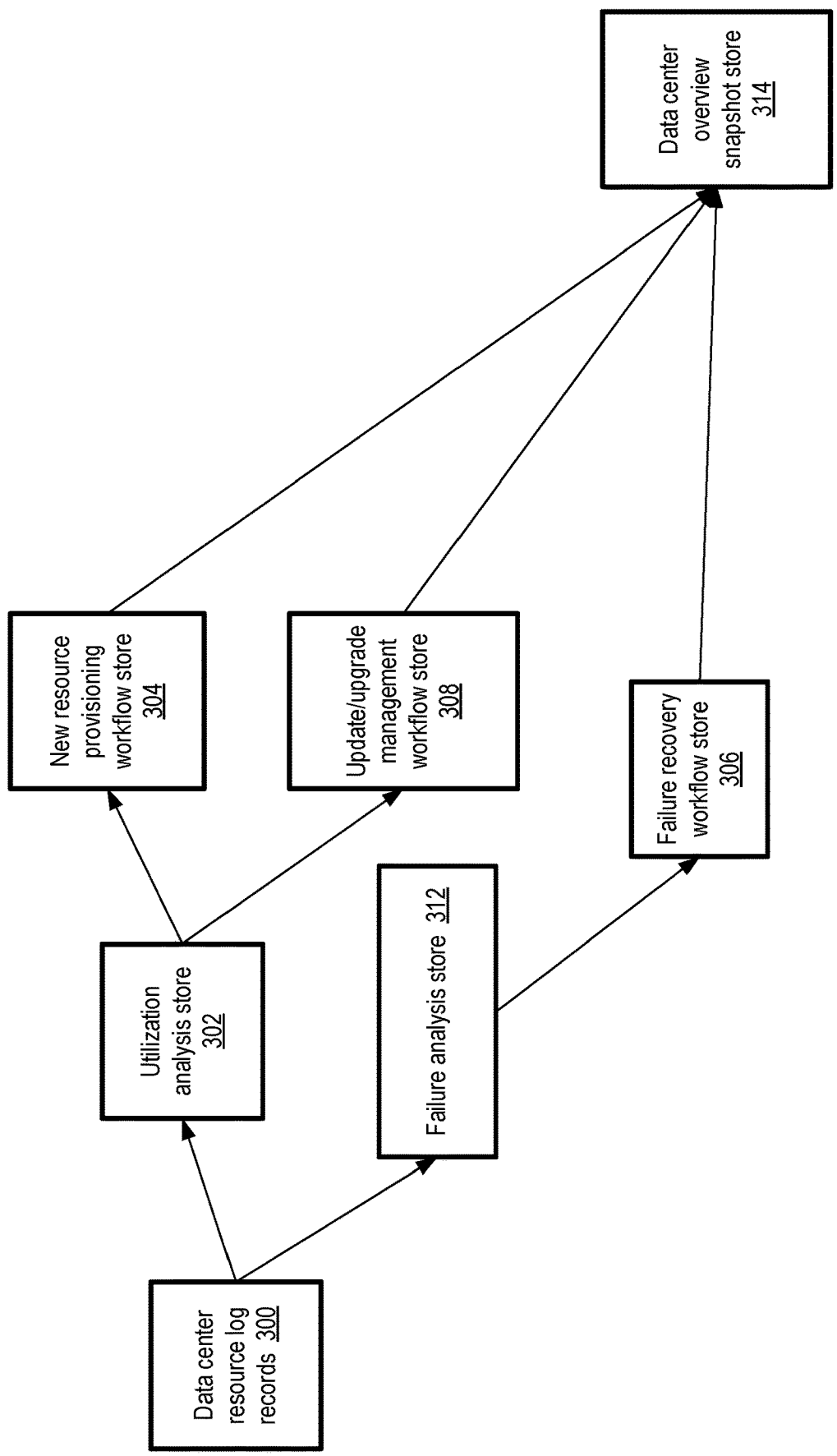
FIG. 3 illustrates an example of a data pipeline pertaining to management of data center resources, according to at least some embodiments.

FIG. 3 illustrates an example of a data pipeline pertaining to management of data center resources, according to at least some embodiments. Log records 300 may be collected periodically (e.g., once every H hours) from a collection of data center resources of an organization. The log records may represent the initial or raw data set of the pipeline, and may be stored at an object storage service or database service of a cloud provider network in some embodiments.

A first subset of the collected log records, which may for example comprise metrics collected by various kinds of performance analysis tools and stored in the logs, may be transmitted to a utilization analysis store 302 in the depicted embodiment. There, the metrics may be analyzed, and respective derived data sets may be transmitted to a new resource provisioning workflow store 304 and to an update/upgrade management workflow store 308. The new resource provisioning workflow store may comprise a data store (e.g., in a different storage service than was used for the utilization analysis or the raw log records) at which information about a process for acquiring additional resources for the data center based on analysis of the utilization data may be maintained. The update/upgrade management workflow store 308 may be used to store information about a process used for updating or upgrading resources of the data center may be stored.

A second subset of the collected log records 300, which may for example comprise messages indicating warnings or errors encountered at the data center resources, may be transmitted to a failure analysis store 312 in the depicted embodiment. There, the messages may be analyzed, and respective derived data sets may be transmitted to a failure recovery workflow store 306. The failure recovery workflow store may comprise a data store at which information about processes for recovering from or responding to failures or errors at the data center resources may be maintained.

Data about the new resource provisioning workflows, the update/upgrade management workflows, and/or the failure recovery workflows may be transmitted from the corresponding data stores to a data center overview snapshot store 314 in the depicted example scenario. The data set received at the overview snapshot store may be used to present up-to-date views of the state of the data center resources, e.g., to data center managers via graphical user interfaces, indicating for example the number and kinds of new resources being provisioned, the number and kinds of resources undergoing upgrades or updates, the number and kinds of failures or errors that were detected and processed, and so on.

Figure 4:
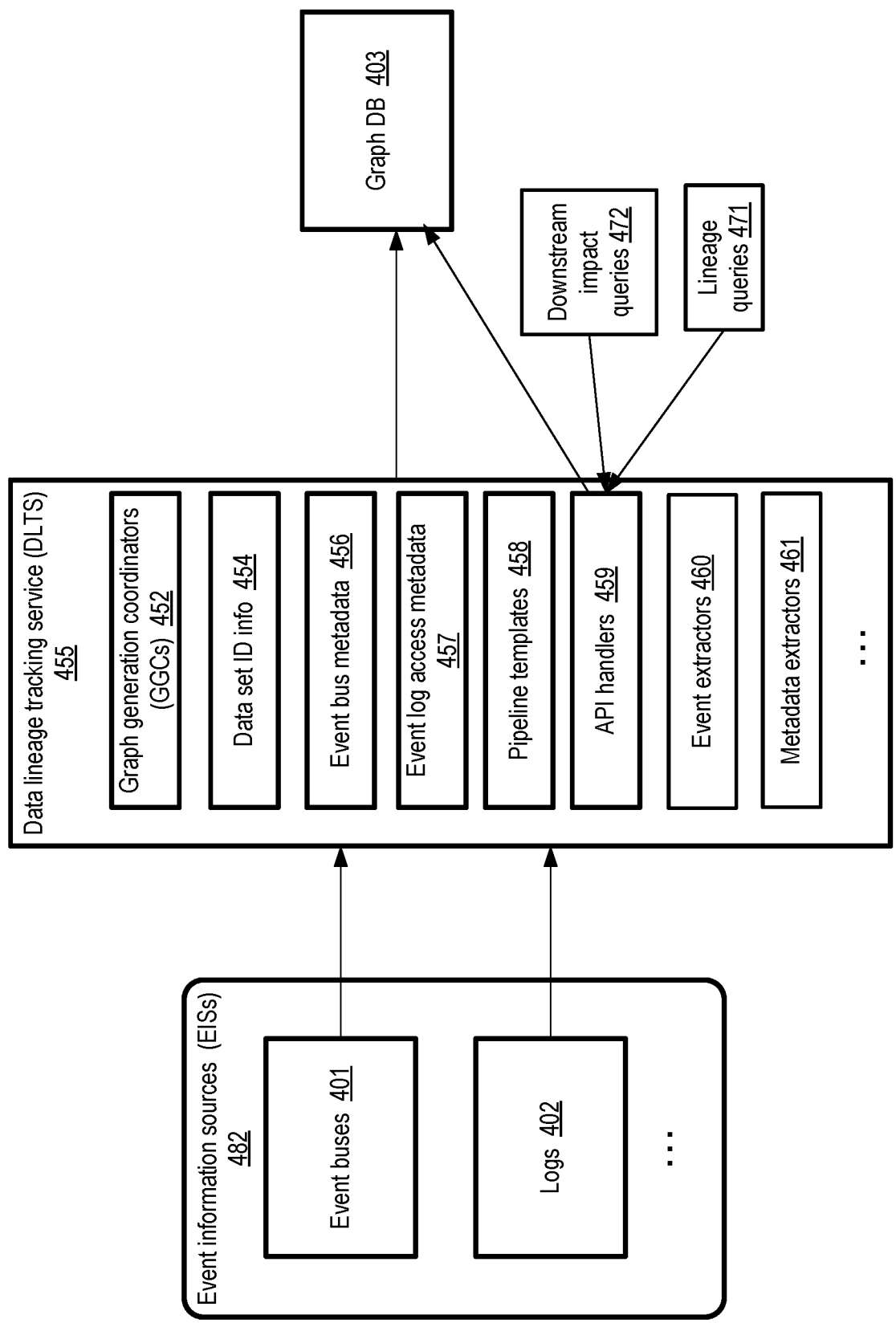
FIG. 4 illustrates example subcomponents of a data lineage tracking service, according to at least some embodiments.

FIG. 4 illustrates example subcomponents of a data lineage tracking service, according to at least some embodiments. DLTS 455 may include one or more GGCs 452, responsible for orchestrating the collection of data pipeline event information from a set of EISs 482 and generating corresponding graphs stored in a graph database 403 in the depicted embodiment. An indication of the specific EISs that should be used to obtain information about events indicating transitions and transformations/analyses of data sets of a data pipeline of interest to a DLTS client may be provided to the DLTS by the client using programmatic interfaces in the depicted embodiment. The EISs may for example include one or more event buses 401 and/or one or more logs 402. An event bus may comprise a logical communication mechanism (implemented for example at a cloud provider network) to which clients may submit or publish records of events via programmatic interfaces. The event bus may enable the publishers of events to specify rules indicating the entities (such as event extractors 460) to which the records should be made accessible in various embodiments. Individual ones of the computing devices used to implement the different stages of a data pipeline may store a set of logs 402, with each log comprising records of events related to the data sets traversing the data pipeline (as well as other kinds of log records) in some embodiments.

Data set ID information 454, which may be provided to the DLTS via programmatic interfaces by DLTs clients in some embodiments, may comprise event selection criteria which can be used to event extractors to determine which subset of events in the EISs pertain to a given data pipeline. Event bus metadata 456 may for example indicate the specific event bus or buses used for a data pipeline, and may in some cases comprise authorization artifacts required to access the specified event buses 401 from the DLTS in some embodiments. Event log access metadata 457 may for example indicate the specific log files which should be accessed to obtain records of events pertaining to a data pipeline, and may in some cases comprise authorization artifacts required to access the logs from the DLTS in some embodiments. Note that in some embodiments, different permissions may be needed to access respective logs and/or event buses, so any given user (such as a member of a team responsible for a particular stage of a data pipeline) may not easily be able to access all the event records needed to get an overall view of the transitions of a given data pipeline. Providing authorization artifacts, needed to access all the different transition records, to a centralized service such as the DLTS may enable the DLTS to generate easy-to-understand graphs that show information about all the data set transitions of numerous data pipelines. The graphs corresponding to the flows of data through a given pipeline may then be made accessible to the members of the teams working on various stages of that pipeline, and/or to other authorized DLTS clients in various embodiments.

In at least some embodiments, clients of a DLTS may provide pipeline templates 458 to the DLTS via programmatic interfaces, specifying various properties of their data pipelines. A given template may for example indicate (a) an expected sequence of transitions of data sets among the plurality of stages of a given data pipeline and (b) temporal information pertaining to the expected sequence of transitions, including a frequency at which one or more events of the pipeline are expected to recur (e.g., that updated collections of purchase-related transaction records are expected to be obtained at a particular stage once every 30 minutes). Other metadata such as the groups of individuals or entities responsible for transitions of various data sets may be included in the templates in some embodiments as indicated below. The templates may be used in several ways by the DLTS in some embodiments. Firstly, they may be used to respond to queries about downstream impacts—e.g., to indicate, with respect to a given data set at a given stage, the specific downstream or subsequent stages at which that data set (or a filtered/transformed version of that data set) is expected to be received and processed. Secondly, in at least some embodiments, the DLTS may use the templates to verify that the event records it obtains from an EIS represent expected types of events—e.g., that a data set transfer or copy operation is one that a template indicates as an anticipated or expected event. In at least some embodiments, the DLTS may be able to detect occurrences of failures or delays at a given stage, and provide notifications regarding the failures to authorized entities (such as administrators) of subsequent or downstream stages. In some embodiments, one or more of the templates may be generated at the DLTS itself, e.g., based on analysis of frequent patterns of data set transitions of one or more customers' data pipelines. As such, some of the templates need not be provided by the clients of the DLTS in such embodiments.

API handlers 459 may be responsible for receiving queries such as data set lineage queries 471 and/or downstream impact queries 472 from clients of the DLTS, and utilizing the graphs stored at graph database 403 to respond to such queries in the depicted embodiment. In some embodiments, the information provided in response to such queries may include metadata that was not available in the event records of the EISs, such as performance data and trends of the kind mentioned above. Metadata extractors 461 may be responsible for obtaining such additional metadata, e.g., from performance monitoring agents or services, and providing the metadata to the GGCs for inclusion in the generated graphs stored in graph database 403. The additional metadata may be stored in the nodes and/or edges of the graphs, and accessed to provide responses to the queries directed by clients to the DLTS in the depicted embodiment.

Figure 5:
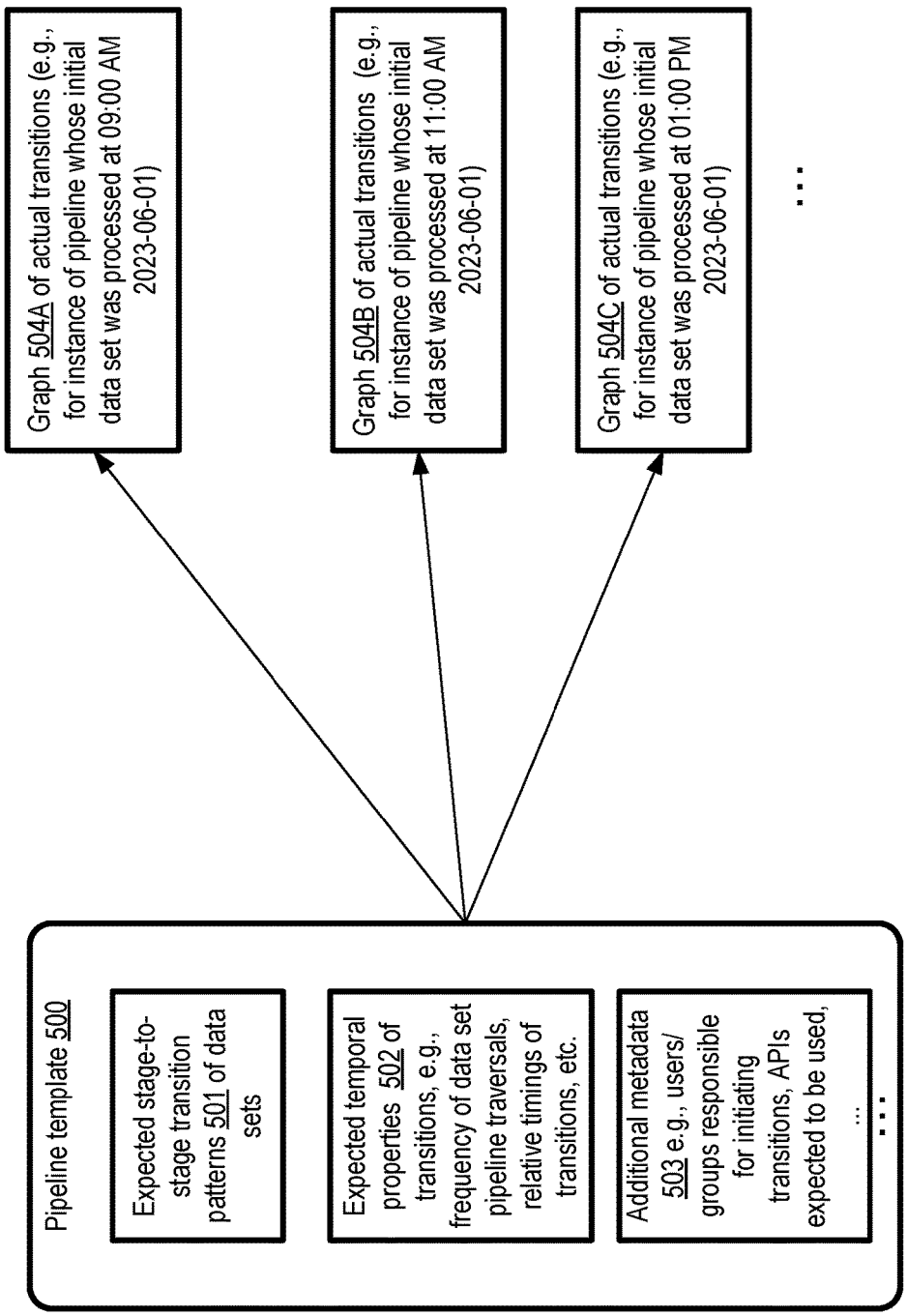
FIG. 5 illustrates example contents of data pipeline templates, according to at least some embodiments.

As mentioned above, templates for data pipelines may be used to implement a portion of the functionality of a DLTS in various embodiments. A pipeline template may indicate the kinds of data set transitions that may be expected to occur (and the sequence in which the transitions are expected to occur relative to each other) for a particular application or set of applications of a DLTS client, e.g., starting with a raw data set collected periodically. Over time, numerous data sets may pass through the stages indicated in the pipeline template, and respective graphs may be generated by the DLTS to represent the actual transitions for each such data set. FIG. 5 illustrates example contents of data pipeline templates, according to at least some embodiments. As shown, pipeline template 500 may indicate expected stage-to-stage transition patterns 501 of the data sets. For example, the expected patterns information included in the template may indicate that a set of records may be collected from logs of a fleet of web servers WSF1 and stored in a first data store DS1, that a subset of those records may be transformed and sent in a particular format from DS1 to a second data store DS2 for machine learning analysis, results of the machine learning analysis and a summarized representation of the subset of data may be sent from DS2 to a third data store DS3, and so on.

Expected temporal properties 502 of the transitions of the template may also be indicated in a pipeline template in some embodiments. Continuing the example above, the expected temporal properties may indicate that the raw log records may typically be collected from the web server fleet WSF1 approximately every 6 hours each day (e.g., at 7 AM in a particular time zone, 1 PM, 7 PM and 1 AM), that the first transformation and transfer from DS1 to DS2 typically takes between 30 and 45 minutes, that the machine learning analysis typically takes between 15 and 30 minutes, and so on. Thus, the approximate expected frequencies of events representing data set pipeline stage traversals, and/or the relative (or absolute) expected timings of various transitions (e.g., including transfers of data sets between data stores, and/or completion of analyses/computations within a given data store) may be indicated in a pipeline template in at least some embodiments.

In some embodiments, a pipeline template may also include additional metadata 503 about the data set transitions, such as identifiers of users or groups typically responsible for initiating various data set transitions, the APIs expected to be used for some or all transitions, and so on.

Corresponding to a given data pipeline template 500, which in some sense may represent an abstraction of expected behavior, several graphs of actual transitions (referred to as concrete instances of the template, or simply as instances) may be generated and stored by the DLTS in the depicted embodiment. For example, graph 504A of actual transitions may be generated and stored for an instance of the pipeline whose initial data set was processed at 9 AM on 2023-06-01, graph 504B of actual transitions may be generated and stored for an instance of the pipeline whose initial data set was processed at 11 AM on 2023-06-01, graph 504C of actual transitions may be generated and stored for an instance of the pipeline whose initial data set was processed at 1 PM on 2023-06-01, and so on.

In at least some embodiments, a template graph may be created and stored at the DLTS to represent a data pipeline template. Template graphs may represent expected data set transition/event patterns (including patterns of events that are yet to occur), in contrast to graphs of recorded events which indicate past occurrences of events. A template graph may be presented to authorized clients by the DLTS in such embodiments, e.g., along with a graph of actual recorded data set transitions, to enable the clients to see how closely the actual transitions matched the expected patterns (e.g., whether the times between various actual transitions were close to the corresponding expected times indicated in the templates).

Pipeline templates may be used to by the DLTS to perform several kinds of tasks in some embodiments. Clients, such as individuals who have recently joined a team responsible for the execution of computations on data sets at a stage of the pipeline, or a team responsible for initiating storage of data sets at a stage of the pipeline, may submit queries to the DLTS to determine the downstream impacts of a given event at a given stage, to get a better overview of the overall flow of data and the impact of their own contributions to the overall flow. Responses to such queries, comprising an indication of another event at a different stage which is dependent on the completion of the given event indicated in the query, may be provided by the DLTS using a pipeline template in various embodiments. In at least some embodiments, when constructing a graph 504 of actual transitions or events, the DLTS may use a corresponding pipeline template to verify that an event which occurred is among the expected events indicated in the pipeline template—e.g., to verify that a transfer of a portion of a data set from one stage to another was among the transfers included in the template, and/or to verify that the timing of the transfer matches expected timings indicated in the template. In some embodiments, if an actual event appears to contradict or be non-compliant with a template, the DLTS may raise an alarm or generate a notification indicating that an anomalous or unexpected event has occurred. Templates may also be used in some embodiments to provide notifications of failures at some stages of a pipeline (e.g., a failure to transfer a data set due to a networking problem or due to a lack of sufficient storage at the stage to which the data set was being transferred) to downstream stages of the pipeline and/or to authorized individuals responsible for tasks at the downstream stages. Information about such authorized individuals may be included in the additional metadata 503 in some embodiments. New stages of a pipeline could be added to a template in some embodiments, e.g., by clients such as administrators of existing stages via programmatic interfaces of the DLTS. Templates may be used for other kinds of tasks in some embodiments. In some embodiments, templates of the kind shown in FIG. 5 may not be used.

Figure 6:
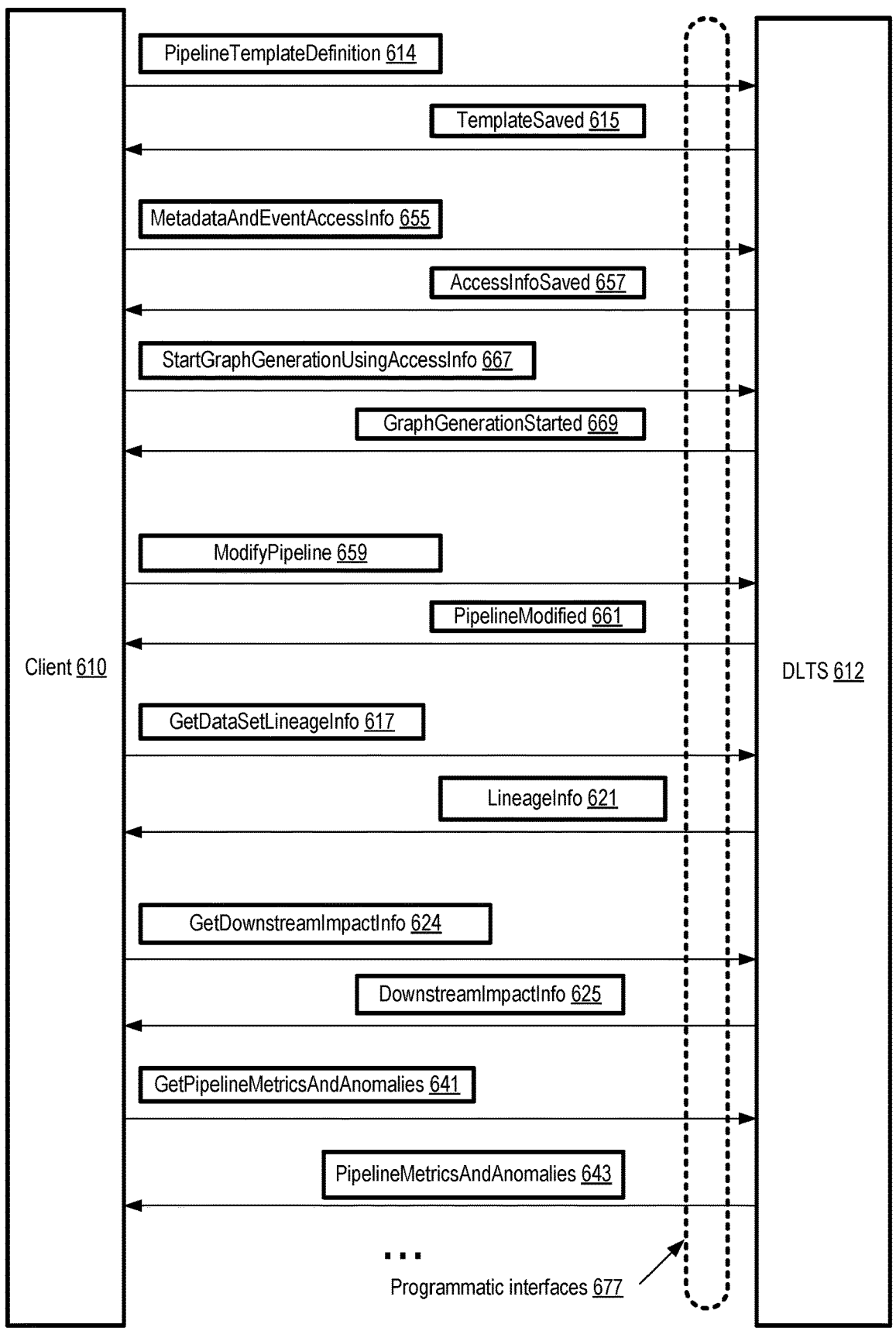
FIG. 6 illustrates example programmatic interactions associated with data lineage tracking, according to at least some embodiments.

FIG. 6 illustrates example programmatic interactions associated with data lineage tracking, according to at least some embodiments. A DLTS 612, similar in features and functionality to DLTS 102 of FIG. 1, may implement a set of programmatic interfaces 677 in the depicted embodiment. The interfaces may include, among others, one or more web-based consoles, graphical user interfaces, command-line tools, and/or APIs. Using such programmatic interfaces, a client 610 of the DLTS (such as an administrator of a data pipeline or an administrator of a stage of a data pipeline) may submit various types of programmatic requests and receive corresponding responses. For example, a PipelineTemplateDefinition message 614 may be submitted via programmatic interfaces 677 in the depicted embodiment, indicating a name of a template of a data pipeline, information about the patterns of events/transitions that data sets are expected to undergo, temporal information of the kind discussed in the context of FIG. 5, and so on. The template may be stored in a repository of the DLTS, and a TemplateSaved response 615 may be sent to the client.

In at least some embodiments, information about the event sources (such as event buses and/or logs) from which records of data set transitions between various stages of a data pipeline can be obtained may be provided by the client to the DLTS via one or more MetadataAndEventAccessInfo messages 655. In addition to records of the event occurrences themselves, in some embodiments additional metadata about the events, such as performance information pertaining to resources at the pipeline stages at which the events occur, may also be collected by the DLTS and included in the graphs generated by the DLTS. Information about the sources from which such metadata is to be obtained may also be included in the MetadataAndEventAcessInfo message in the depicted embodiment. In one embodiment, authorization/authentication information which may be required for the DLTS to extract the event records and/or associated metadata may also be provided in or indicated by the MetadataAndEventAcessInfo message— e.g., the message may indicate a role defined at an identity management service of a cloud provider network which has been granted to the DLTS, enabling the DLTS to access the event records and metadata. Note that in at least some embodiments, the DLTS may be unable to obtain event records from one or more stages of a data pipeline without being provided authorization/authentication information by a client; in some cases, separate sets of authorization/authentication information may be provided for extracting event information of respective stages at which respective authentication policies/roles/credentials etc. are in use. In at least one embodiment, respective members of the teams assigned to work on each stage may grant the DLTS permission to view event information for their stage. The information included in the MetadataAndEventAcessInfo may be stored at the DLTS, and an AccessInfoSaved message 657 may be sent to the client in some embodiments.

In some embodiments, the DLTS may start collecting event records and generating/storing corresponding graphs for a particular data pipeline after the access information included in a MetadataAndEventAcessInfo message for that data pipeline is received. In other a client embodiments, may submit a StartGraphGenerationUsingAccessInfo request 667, and the DLTS may start collecting event records and generating corresponding graphs for the corresponding pipeline after receiving it. A GraphGenerationStarted message 669 may be sent to the client to indicate that the DLTS has started collecting event data and metadata for graphs in some embodiments. In at least one embodiment, after one or more graphs have been generated based on the information provided in a MetadataAndEventAcessInfo message, the DLTS may itself generate a pipeline template for the corresponding data pipeline; as such, a template need not be provided by a client but may instead be created by the DLTS itself in some embodiments.

A ModifyPipeline request 659 may be sent to the DLTS by the client via the programmatic interfaces 677 in some embodiments, indicating a change to a pipeline for which graphs were already being generated by the DLTS, and/or indicating a change to a previously stored pipeline template. The client may for example use the ModifyPipeline request to indicate a new stage to be added to a pre-existing pipeline (along with event information sources for data set transitions to/from/at the new stage), indicate that an existing stage is to be removed or changed, modify the current set of event information sources and event selection criteria, and so on. A record of the requested changes may be stored at the DLTS, and a PipelineModified response message 661 may be sent to the client in the depicted embodiment.

A client such as an employee of an organization by which one or more stages of a data pipeline are implemented may submit a data set lineage request in the form of a GetDataSetLineageInfo request 617 in some embodiments. The lineage request may indicate a particular data set at a particular stage of a pipeline for which lineage or historical information is being requested. In response, the DLTS may look up a graph corresponding to the specified data set, and send a LineageInfo response 621 to the client, comprising an indication of a sequence or set of events (represented in the graph) that led to the presence of the particular data set at the particular stage. The set of events may include transfers of predecessor data sets among various predecessor stages, for example. In some cases, by in order to reach the particular stage with respect to which a lineage request is submitted during the flow of data through a pipeline, the predecessor data sets of earlier stages may have been transformed substantially (e.g., summarized versions of data sets of earlier stages may form the particular data set whose lineage is being queried), so it may not be possible or straightforward to track the history of the data through the pipeline without accessing records of the transitions represented in the graph. Simply examining the contents of predecessor data sets may not be sufficient to determine the relationships between data sets at different stages in various embodiments; the creation of graphs by the DLTS may thus be essential to help tie the data sets and transformation operations of the pipeline together, and thus help prepare responses to lineage queries in such embodiments. Note that in at least some embodiments, a lineage request may be received (and a corresponding response provided by the DLTS) while the transitions or events of the pipeline as a whole are still underway. For example, consider a scenario in which a pipeline comprises four stages S1, S2, S3 and S4, and a lineage request pertaining to a data set DS1 at stage S3 is received prior to a transition which leads to a transfer of a data set from stage S3 to S4. In this scenario, the DLTS may provide lineage information pertaining to predecessor events at stages S1 and S2, even though there is still one stage (S4) which has not yet been traversed. In some embodiments, the LineageInfo response may indicate times at which various predecessor events (such as transfers of predecessor data sets) occurred with respect to the presence of the particular data set at the particular stage, identification information (e.g., account identifiers, user identifiers, etc.) regarding the entities responsible for predecessor events, the names and parameters of APIs that were invoked to cause the occurrences of predecessor events, and so on. In at least some embodiments, a visualization of the graph created by the DLTS for the pipeline to which the lineage information request applies may be provided via the programmatic interfaces 677, enabling the client to click on various stages to obtain more details about each transition represented in the graph.

A GetDownstreamImpactInfo message 624 may be sent by a client via programmatic interfaces in some embodiments to request information about one or more expected downstream events of a specified event of a pipeline (i.e., events which are expected to directly or indirectly follow or succeed the specified event). In response, the DLTS may identify a template of the specified pipeline, identify such downstream events using the template, and send a DownstreamImpactInfo response 625 indicating the downstream events and/or associated downstream stages to the client.

In at least some embodiments, a GetPipelineMetricsAndAnomalies request 641 may be submitted by a client such as an administrator of a given pipeline or stage to obtain metrics associated with a specified data pipeline. Several metrics pertaining to the data pipelines for which the DLTS collected event information and creates graphs may be collected by the DLTS, such as the number and sizes of data sets that have passed through each of the stages during various time intervals, the resource utilizations of the devices used at the different stages, the number and kinds of errors (if any) that have been detected at the different stages, the differences between the times actually taken for various transitions and the expected times indicated in the corresponding templates, any significant anomalies detected with respect to pipeline transitions, and so on. The detected anomalies may include timing-related anomalies (e.g., when a data set is transferred between two stages several hours later or earlier than expected), data set size related anomalies (when a data set is much larger or smaller than expected at a particular stage based on recent trends), functional or API anomalies (e.g., in cases where a value of a parameter of an API invoked for a particular data set transition differ from the values that have been used for the same parameter over several recent instances of the pipeline), and so on. Some or all of the collected metrics and/or anomalies may be provided to the client via one or more PipelineMetricsAndAnomalies messages 643 in the depicted embodiment. In some embodiments, programmatic interactions other than those shown in FIG. 6 may be supported by a DLTS.

Figure 7:
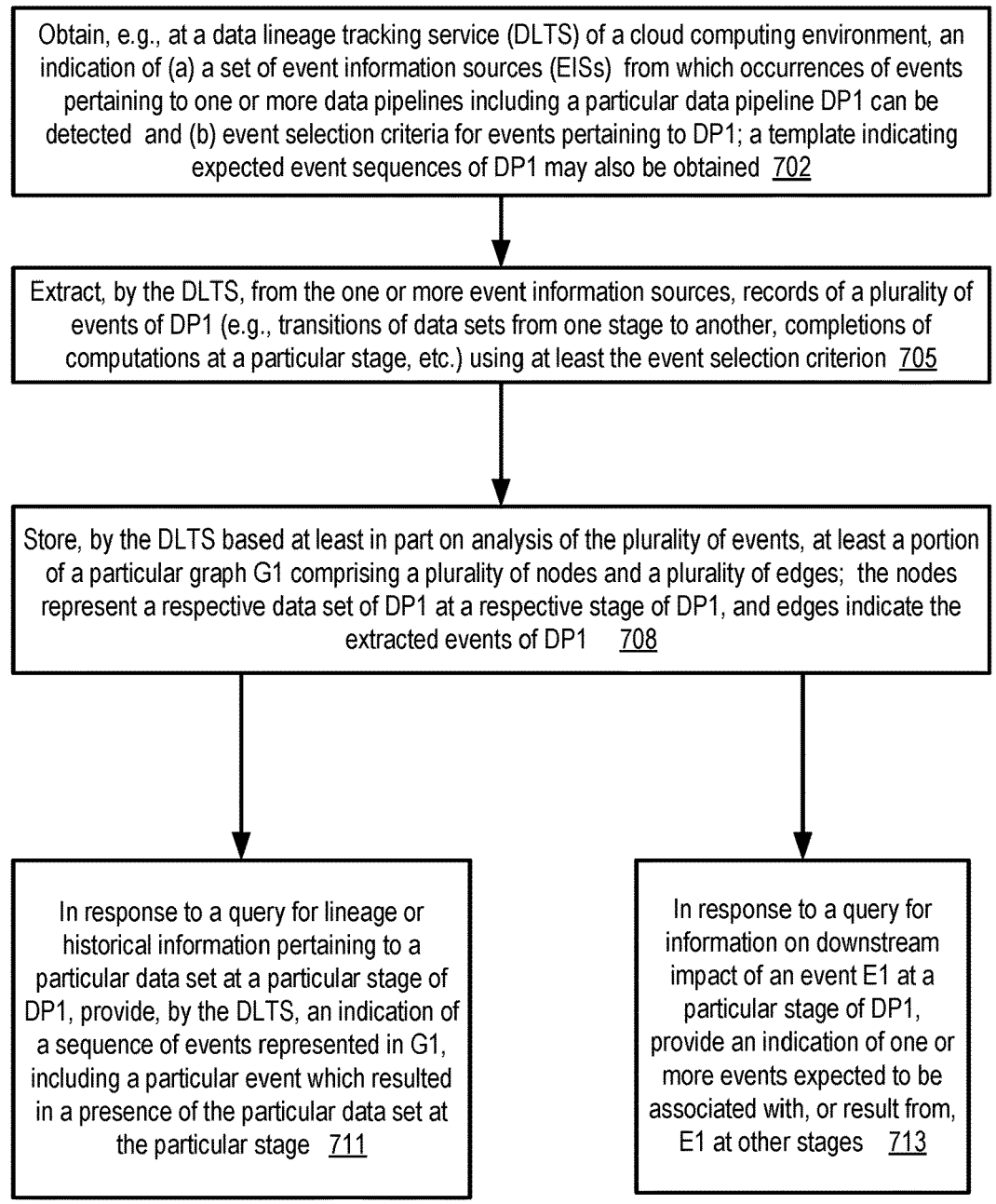
FIG. 7 is a flow diagram illustrating aspects of example operations that may be performed at a data lineage tracking service, according to at least some embodiments.

FIG. 7 is a flow diagram illustrating aspects of example operations that may be performed at a data lineage tracking service, according to at least some embodiments. As shown in element 702, an indication of a set of event information sources (EISs) pertaining to a one or more data pipelines including a particular data pipeline DP1 of a client, as well as event selection criteria may be obtained at a DLTS. The EISs may provide evidence or records of occurrences of events (such as data set transfers, copies, analysis, filtering operations or transformations) pertaining to DP1, and the event selection criteria may indicate how events pertaining specifically to DP1 can be identified from among a potentially larger set of events recorded in the EISs. In at least some embodiments, a template indicating expected event sequences of DP1 may also be obtained and/or generated at the DLTS.

Using at least the event selection criteria, in various embodiments records of a plurality of events of DP1 (such as transitions of data sets from one storage stage to another, completions of computations performed at a given stage, etc.) may be extracted from the EISs (element 705). From the extracted records, at least a portion of a graph G1 may be constructed at the DLTS in various embodiments (element 708). G1 may comprise several nodes and edges connecting various pairs of nodes. A given node may represent a respective data set of DP1 at a respective stage of DP1, while edges may represent the extracted events in the depicted embodiment. In some embodiments, G1 may be stored within a graph database service of the provider network.

The DLTS may receive and respond to at least two kinds of queries pertaining to DP1 in the depicted embodiment. In response to a query for lineage or historical information pertaining to a particular data set at a particular stage of DP1 (element 711), the DLTS may provide an indication of a sequence of events represented in G1. The sequence may include at least one event which resulted in, led to, or contributed to the presence of the data set at that particular stage (e.g., an event whose occurrence was a prerequisite for the presence of the particular data set at the particular stage of DP1). For example, such an event may comprise a transfer of at least a portion of contents of the particular data set to a predecessor stage, a completion of a computation on a portion of contents of the particular data set, etc. In response to a query for information on downstream impact of an event E1 at a particular stage of DP1 (e.g., a query requesting an indication of a downstream or successor event with respect to E1), the DLTS may provide an indication of one or more events expected to be associated with, or result from, E1 at one or more subsequent stages of DP1 in the depicted embodiment (element 713).

It is noted that in various embodiments, some of the operations shown in the flow diagram of FIG. 7 may be implemented in a different order than that shown in the figure, or may be performed in parallel rather than sequentially. Additionally, some of the operations shown in FIG. 7 may not be required in one or more implementations. For example, in one implementation, the DLTS may support lineage queries only, and may not support downstream impact queries.

Figure 8:
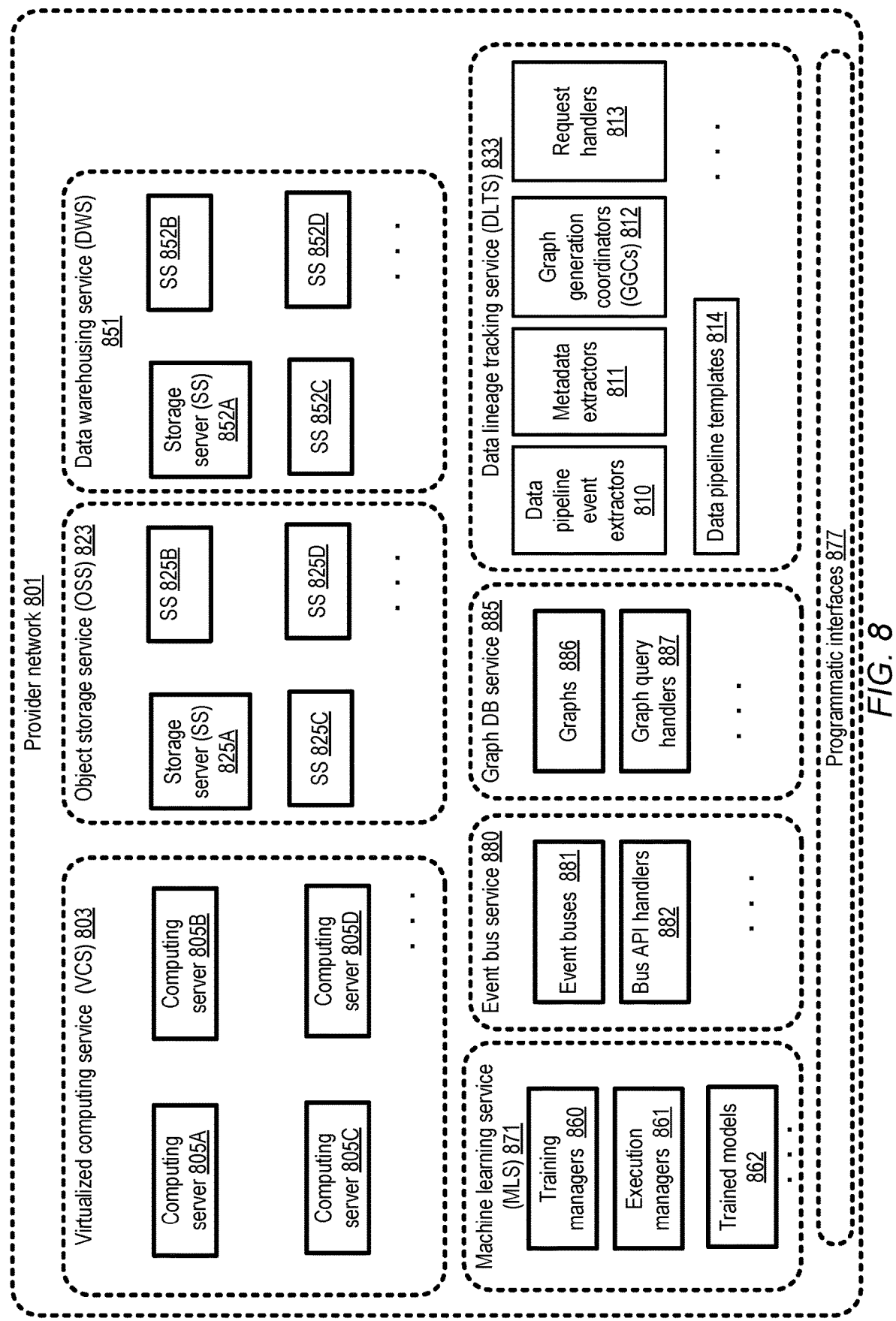
FIG. 8 illustrates an example provider network at which a data lineage tracking service may be implemented, according to at least some embodiments.

In at least one embodiment, as indicated above, at least a portion of a DLTS may be implemented at a provider network or cloud computing environment. FIG. 8 illustrates an example provider network at which a data lineage tracking service may be implemented, according to at least some embodiments. In the depicted embodiment, provider network 801 may comprise resources used to implement a plurality of network-accessible services, including for example a virtualized computing service (VCS) 803, an object storage service (OSS) 823, a data warehousing service (DWS) 851, a machine learning service (MLS) 871, an event bus service 880, and a graph database service 885 in addition to a DLTS 833. The DLTS, similar in features and functionality to DLTS 102 of FIG. 1, may include data pipeline event extractors 810, metadata extractors 811, graph generation coordinators 812, and data pipeline templates 814 in the depicted embodiment. Graphs 886 stored in a format supported at the graph DB service 885 may include at least some graphs of data pipeline instances that were generated by the DLTS's GGCs 812. At least some queries received at request handlers 813 of the DLTS, such as data set lineage queries of the kind discussed above, may be executed on the GCG-generated graphs with the help of graph query handlers 887.

The stages of the data pipelines whose events are converted into graphs by the GCGs of the DLTS may utilize resources at one or more other services of the provider network 801. For example, some data storage stages of a data pipeline may utilize storage servers (SSs) such as SS 825A, SS 825B, SS 825C or SS 825D of the OSS 823, while other data storage stages may utilize storage servers of the DWS 851, such as SS 852A, SS 852B, SS 852C or SS 852D. In some embodiments, the cloud provider network may include a streaming data management service not shown in FIG. 8, and stream records collected/stored at such a service may form parts of the data sets of a data pipeline. In some cases, records of ingestion or processing of such stream records may represent examples of the kinds of events that are extracted by the DLTS event extractors. Some of the computations performed in data sets at various stages of data pipelines may be executed using computing servers of the VCS, such as computing server 805A, 805B, 805C or 805D. Event buses 881, into which records of data set events/transitions can be inserted from various stages of data pipelines via invocations of APIs, which are handled by bus API handlers 882, may serve as event information sources for the DLTS data pipeline event extractors in the depicted embodiment. The computing servers of the VCS may also be used to implement subcomponents of the DLTS itself in some embodiments, such as GCGs, data pipeline event extractors, metadata extractors and/or request handlers. In some data pipeline stages, trained models 862 (whose training was orchestrated by training managers 860) of MLS 871 may be run with the help of execution managers 861 may be employed. Components of a given service of a provider network may thus in general utilize components of other services in the depicted embodiment. Individual ones of the services shown in FIG. 8 may implement a respective set of programmatic interfaces 877 which can be used by external and/or internal clients (where the internal clients may comprise components of other services) in the depicted embodiment. In at least some embodiments, resources of a cloud provider network may not be required for the kinds of data lineage tracking techniques introduced above; instead, for example, a standalone set of tools may be used.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, a DLTS may be implemented at least in part using an edge location of the provider network instead of or in addition to regional data centers. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as provider network extension sites or local zones (due to being more local or proximate to a group of users than traditional availability zones). A local zone may be connected in various ways to a publicly accessible network such as the Internet, for example directly, via another network, or via a private connection to a region. In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network.

A VCS of the cloud provider network may offer virtual compute instances (also referred to as virtual machines, or simply "instances") with varying computational and/or memory resources in various embodiments, which may be used to implement a DLTS as indicated above. In one embodiment, each of the virtual compute instances may correspond to one of several instance types or families, and instances of any of several families may be employed for computations of the DLTS. An instance type may be characterized by its hardware type, computational resources (e.g., number, type, and configuration of central processing units (CPUs) or CPU cores, hardware accelerators for various tasks), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, a non-burstable or dedicated instance type that is allotted and guaranteed a fixed quantity of resources, or an instance type optimized for radio-based applications). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on.

The traffic and operations of the cloud provider network, and individual services such as the DLTS, may broadly be subdivided into two categories in various embodiments: control plane operations and data plane operations. While the data plane represents the movement of data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information management). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

Figure 9:
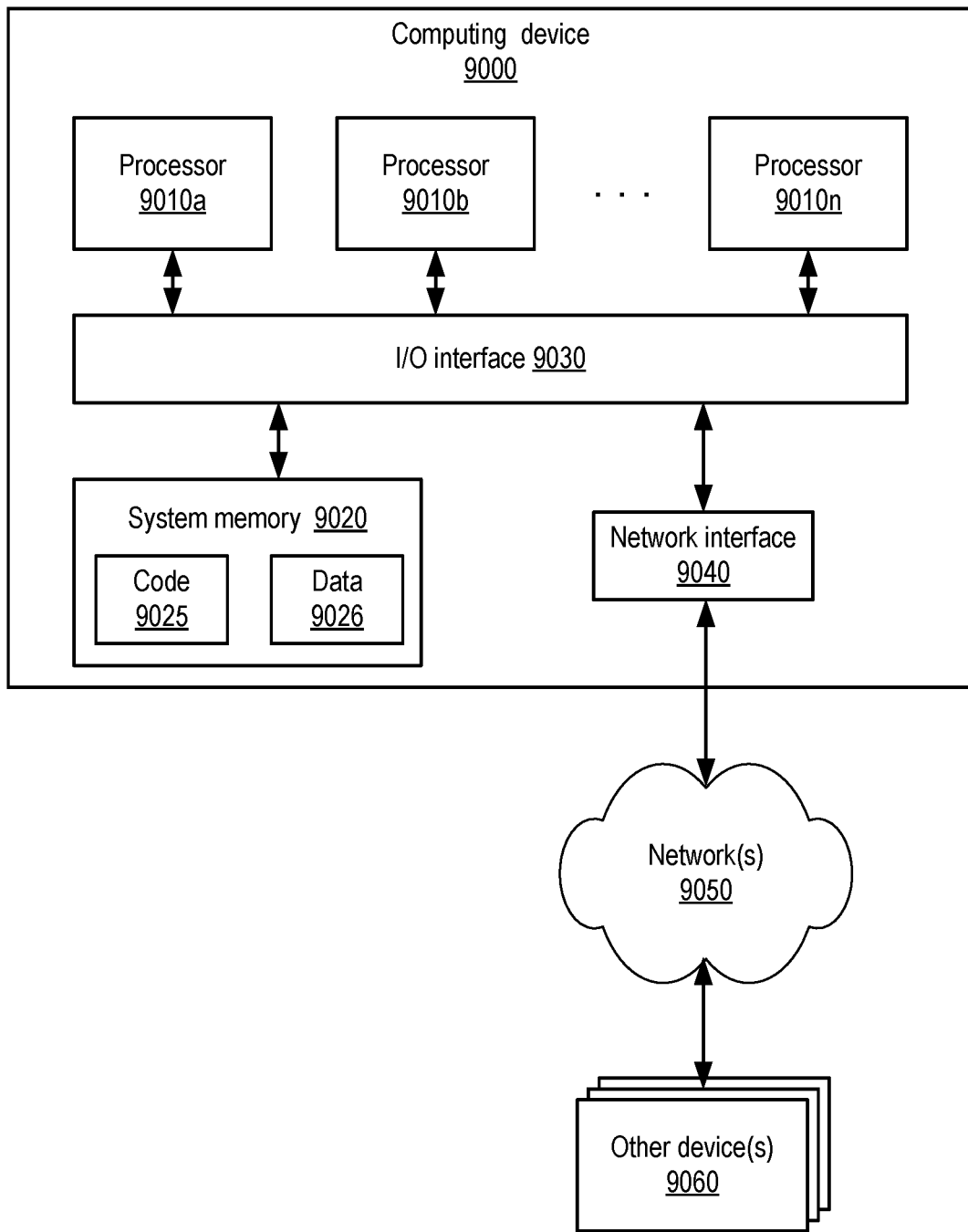
FIG. 9 is a block diagram illustrating an example computing device that may be used in at least some embodiments.

In at least some embodiments, a server that implements the types of techniques described herein (e.g., various functions of a DLTS and/or other services of a provider network), may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 8. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across the one or more computing devices:
obtain, at a data lineage tracking service of a cloud computing environment, an indication of (a) one or more event information sources from which occurrences of events pertaining to one or more data pipelines including a particular data pipeline can be detected and (b) a selection criterion for events pertaining to the particular data pipeline, wherein the particular data pipeline includes a plurality of stages including a first data storage stage, a second data storage stage, and a data analysis stage;
extract, by the data lineage tracking service, from the one or more event information sources, using at least the selection criterion, information pertaining to occurrences of a plurality of events including a first event which represents a transfer of at least a portion of a first data set from the first data storage stage to form a second data set at the second data storage stage, a second event which represents a transfer of at least a portion of the second data set from the second data storage stage to form a third data set at the data analysis stage, and a third event which represents a completion of a computation performed on at least a portion of the third data set at the data analysis stage;
store, by the data lineage tracking service based at least in part on analysis of the plurality of events, in a graph database at the cloud computing environment, at least a portion of a particular graph comprising a plurality of nodes and a plurality of edges, wherein individual ones of the nodes represent a respective data set at a respective stage of the plurality of stages, and wherein individual ones of the edges indicate individual ones of the plurality of events; and in response to a first query for lineage information pertaining to a particular data set at a particular stage of the plurality of stages, provide, by the data lineage tracking service, an indication of a sequence of events represented in the particular graph, including a particular event which resulted in a presence of the particular data set at the particular stage.

2. The system as recited in claim 1, wherein the one or more event information sources comprise one or more of: (a) an event bus implemented at the cloud computing environment or (b) one or more logs.

3. The system as recited in claim 1, wherein the first data storage stage comprises one or more resources of a first storage service of the cloud computing environment which supports a first set of application programming interfaces and a first data model, wherein the second data storage stage comprises one or more resources of a second storage service of a cloud computing environment which supports a second set of application programming interfaces and a second data model, wherein at least one application programming interface of the first set of application programming interfaces is not in the second set of application programming interfaces, and wherein the first data model differs from the second data model.

4. The system as recited in claim 1, wherein the one or more computing devices include further instructions that upon execution on or across the one or more computing devices:
    store a first template corresponding to the particular data pipeline, wherein the first template indicates (a) an expected sequence of transitions of data sets among the plurality of stages and (b) temporal information pertaining to the expected sequence of transitions, including a frequency at which one or more events of the particular data pipeline are expected to recur; and
    verify, using at least the first template, that a transfer of at least a portion of a data set between a pair of stages of the plurality of stages is an expected transfer.

5. The system as recited in claim 4, wherein the one or more computing devices include further instructions that upon execution on or across the one or more computing devices:
    receive a query requesting an identification of one or more expected downstream events with respect to a specified event of the particular data pipeline; and
    provide, based at least in part on the first template, an indication of a particular expected downstream event with respect to the specified event.

6. A computer-implemented method, comprising:
    extracting, from one or more event information sources, in response to one or more programmatic requests, a plurality of events including a first event which represents a transfer of at least a portion of a first data set from a first data storage stage of a first data pipeline to form a second data set at a second data storage stage, and a second event which represents a completion of a computation performed on at least a portion of the second data set;
    storing, based at least in part on analysis of the plurality of events, at least a portion of a particular graph comprising a plurality of nodes and a plurality of edges, wherein individual ones of the nodes represent a respective data set at a respective stage of a plurality of stages of the first data pipeline, and wherein individual ones of the edges indicate individual ones of the plurality of events; and
    in response to a first request for lineage information pertaining to a particular data set at a particular stage of the plurality of stages, providing an indication of a sequence of events represented in the particular graph, including a particular event which resulted in a presence of the particular data set at the particular stage.

7. The computer-implemented method as recited in claim 6, wherein the one or more event information sources comprise one or more of: (a) an event bus implemented at a network-accessible service of a cloud provider network or (b) one or more logs.

8. The computer-implemented method as recited in claim 6, wherein the first data storage stage comprises one or more resources of a first storage service of a cloud computing environment which supports a first set of application programming interfaces and a first data model, wherein the second data storage stage comprises one or more resources of a second storage service of a cloud computing environment which supports a second set of application programming interfaces and a second data model, wherein at least one application programming interface of the first set of application programming interfaces is not in the second set of application programming interfaces, and wherein the first data model differs from the second data model.

9. The computer-implemented method as recited in claim 6, wherein the indication of the sequence of events indicates a time at which a predecessor data set of the particular data set was stored at the first data storage stage.

10. The computer-implemented method as recited in claim 6, wherein the indication of the sequence of events indicates an entity responsible for causing a predecessor data set of the particular data set to be transferred from the first data storage stage to the second data storage stage.

11. The computer-implemented method as recited in claim 6, wherein the indication of the sequence of events indicates one or more parameters of an application programming interface (API) whose invocation caused a predecessor data set of the particular data set to be transferred from the first data storage stage to the second data storage stage.

12. The computer-implemented method as recited in claim 6, further comprising:
    storing a first template representing the first data pipeline, wherein the first template indicates (a) an expected sequence of transitions of data sets among the plurality of stages and (b) temporal information pertaining to the expected sequence of transitions, including a frequency at which one or more events of the first data pipeline are expected to recur; and
    verifying, using at least the first template, that a transfer of a portion of a data set between a pair of stages of the plurality of stages is an expected transfer.

13. The computer-implemented method as recited in claim 12, further comprising:
    receiving a query requesting an identification of one or more expected downstream events with respect to a specified event of the first data pipeline; and
    providing, based at least in part on the first template, an indication of a particular expected downstream event with respect to the specified event.

14. The computer-implemented method as recited in claim 6, further comprising:

receiving, via one or more programmatic interfaces, an indication of (a) an additional stage to be included in the first data pipeline and (b) an event information source associated with the additional stage; and adding, to the particular graph, a node representing another data set at the additional stage.

15. The computer-implemented method as recited in claim 6, further comprising:

in response to a detection of a failure associated with the first data storage stage, causing an indication of the failure to be transmitted to a destination associated with one or more other stages of the first data pipeline.

16. One or more non-transitory computer-accessible storage media storing program instructions that when executed on or across one or more processors:

extract, from one or more event information sources, in response to one or more programmatic requests, a plurality of events including a first event which represents a transfer of at least a portion of a first data set from a first data storage stage of a first data pipeline to form a second data set at a second data storage stage, and a second event which represents a completion of a computation performed on at least a portion of the second data set;

store, based at least in part on analysis of the plurality of events, at least a portion of a particular graph comprising a plurality of nodes and a plurality of edges, wherein individual ones of the nodes represent a respective data set at a respective stage of a plurality of stages of the first data pipeline, and wherein individual ones of the edges indicate individual ones of the plurality of events; and in response to a first request for lineage information pertaining to a particular data set at a particular stage of the plurality of stages, provide an indication of a sequence of events represented in the particular graph, including a particular event which resulted in a presence of the particular data set at the particular stage.

17. The one or more non-transitory computer-accessible storage media as recited in claim 16, wherein the one or more event information sources comprise one or more of: (a) an event bus implemented at a network-accessible service of a cloud provider network or (b) one or more logs.

18. The one or more non-transitory computer-accessible storage media as recited in claim 16, wherein the indication of the sequence of events indicates an entity responsible for causing a predecessor data set of the particular data set to be transferred from the first data storage stage to the second data storage stage.

19. The one or more non-transitory computer-accessible storage media as recited in claim 16, storing further program instructions that when executed on or across the one or more processors:

store a first template representing the first data pipeline, wherein the first template indicates (a) an expected sequence of transitions of data sets among the plurality of stages and (b) temporal information pertaining to the expected sequence of transitions, including a frequency at which one or more events of the first data pipeline are expected to recur; and verify, using at least the first template, that a transfer of a portion of a data set between a pair of stages of the plurality of stages is an expected transfer.

20. The one or more non-transitory computer-accessible storage media as recited in claim 19, storing further program instructions that when executed on or across the one or more processors:

receive a query requesting an identification of one or more expected downstream events with respect to a specified event of the first data pipeline; and provide, based at least in part on the first template, an indication of a particular expected downstream event with respect to the specified event.

* * * * *